(12) United States Patent
Farag

(10) Patent No.: US 10,826,868 B2
(45) Date of Patent: Nov. 3, 2020

(54) NAT AWARE DNS

(71) Applicant: T-Mobile USA, Inc., Bellevue, WA (US)

(72) Inventor: Paul S. Farag, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 462 days.

(21) Appl. No.: 15/084,357

(22) Filed: Mar. 29, 2016

(65) Prior Publication Data
US 2017/0289101 A1   Oct. 5, 2017

(51) Int. Cl.
*H04L 12/24* (2006.01)
*H04L 29/12* (2006.01)

(52) U.S. Cl.
CPC ...... *H04L 61/1511* (2013.01); *H04L 61/2046* (2013.01)

(58) Field of Classification Search
CPC .......................... H04L 61/1511; H04L 61/2046
USPC ........................................................ 709/245
See application file for complete search history.

(56) References Cited

U.S. PATENT DOCUMENTS

| | | | | |
|---|---|---|---|---|
| 6,393,488 B1 * | 5/2002 | Araujo | ............. | H04L 29/12009 709/227 |
| 6,493,765 B1 * | 12/2002 | Cunningham | .... | H04L 29/12018 370/351 |
| 6,892,245 B1 * | 5/2005 | Crump | ............. | H04L 29/12066 709/223 |
| 9,021,560 B1 * | 4/2015 | Emigh | ............... | H04L 63/0227 726/4 |
| 9,300,581 B1 * | 3/2016 | Hui | ........................ | H04L 45/74 |
| 9,344,320 B1 * | 5/2016 | Volkman | ................ | H04L 29/06 |
| 2004/0233916 A1 * | 11/2004 | Takeuchi | .......... | H04L 29/12066 370/395.54 |
| 2006/0031536 A1 * | 2/2006 | Eydelman | ......... | H04L 29/06027 709/228 |
| 2006/0161960 A1 * | 7/2006 | Benoit | ............. | G08B 13/19656 725/105 |
| 2006/0215649 A1 * | 9/2006 | Morrall | ............. | H04L 29/12009 370/389 |

(Continued)

*Primary Examiner* — Moustafa M Meky
*Assistant Examiner* — Elizabeth Kassa
(74) *Attorney, Agent, or Firm* — Knobbe, Martens, Olson & Bear, LLP

(57) ABSTRACT

Systems and methods are provided for resolving conflicting network addresses by utilizing a DNS server to configure an edge computing device. The DNS server may receive, from a client computing device, a request to resolve a hostname of a recipient computing device. The DNS server may determine a resolved network address corresponding to the hostname and may determine that the resolved network address conflicts with another network address. The DNS server may determine a substitute network address, provide the edge computing device with information for translating the substitute network address into the resolved network address, and provide the substitute network address to the client computing device. The edge computing device may receive the substitute network address from the client computing device, translate the substitute network address into the resolved network address of the recipient computing device, and send network data from the client computing device to the recipient computing device.

20 Claims, 6 Drawing Sheets

(56) References Cited

U.S. PATENT DOCUMENTS

| | | | | |
|---|---|---|---|---|
| 2006/0251088 A1* | 11/2006 | Thubert | .............. | H04L 12/2898 370/401 |
| 2008/0140847 A1* | 6/2008 | Almog | .............. | H04L 29/12066 709/228 |
| 2012/0317252 A1* | 12/2012 | Vemulapalli | ........ | H04L 61/2046 709/221 |
| 2014/0047500 A1* | 2/2014 | Byrnes | ................ | H04L 63/0227 726/1 |

* cited by examiner

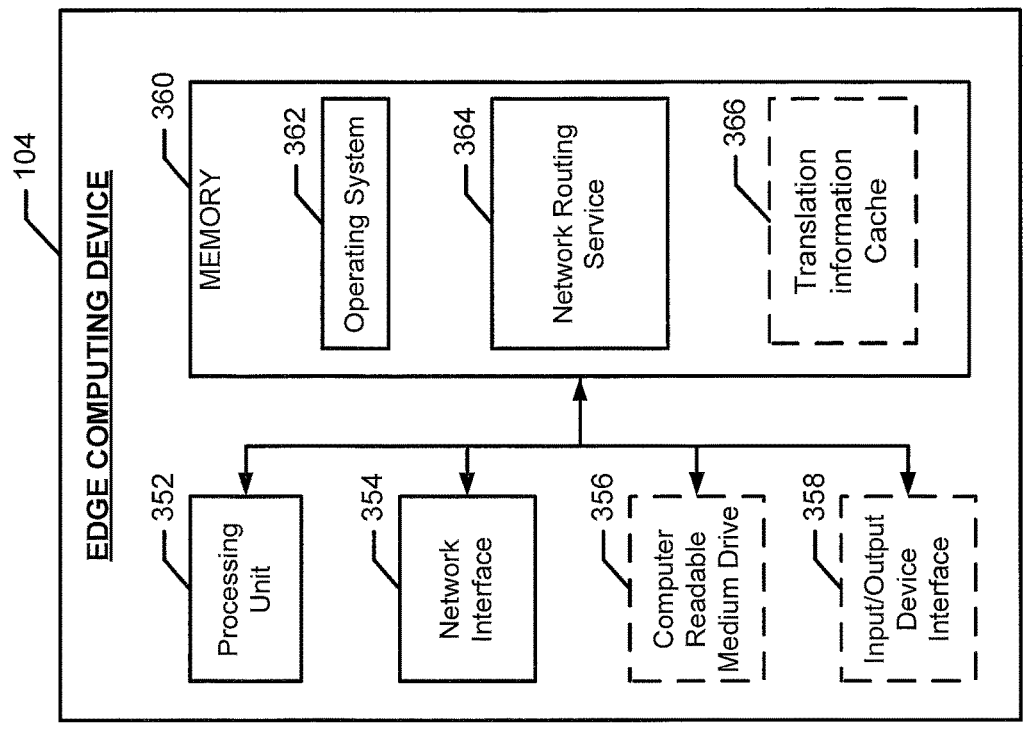
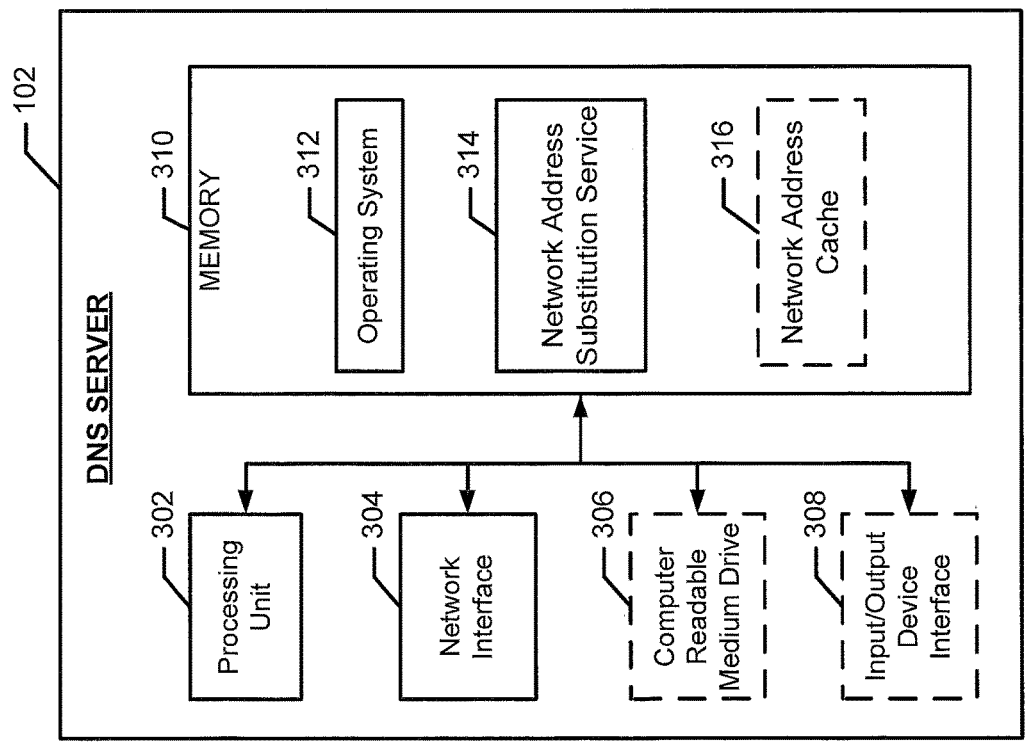
FIG. 3B
FIG. 3A

NAT AWARE DNS

BACKGROUND

Some computer networks utilize two naming conventions to address computing devices in those networks. The first naming convention corresponds to assigning network addresses (e.g., Internet Protocol or "IP" addresses) to computing devices in the network. A network address of a computing device indicates a specific location of that computing device within the network and is used by other computing devices when communicating with the computing device. For example, the network IP address of a first computing device may be 192.168.1.1, and a second computing device may communicate with the first computing device by addressing communications to the 192.168.1.1 IP address. Because IP addresses and other network addresses of potentially thousands of computing devices may be difficult or impossible for users to use casually, a second naming convention related to a domain name system is employed. The domain name system associates more human-readable names for computing devices in a network. In the above example, the first computing device may be associated with the hostname "<some_domain_name>" or the fully qualified domain name "www.<some_domain_name>.com.," which includes the hostname and related domain information.

In order to enable a user of the second computing device to communicate with the first computing device in the network using a hostname of the first computing device, an entity in the network translates the hostname of the first computing device into the actual network address of the first computing device. Usually, a Domain Name System ("DNS") server provides this translation service by receiving a hostname from a computing device and determining the network address that corresponds to the hostname. Continuing with the above example, the DNS server may receive the hostname "<some_domain_name>" from the second computing device and may determine that the corresponding IP address of the first computing device is 192.168.1.1. The DNS server may then provide the IP address of the first computing device to the second computing device for use in communicating with the first computing device.

Occasionally, a network includes a set of computing devices that utilize a range of network addresses that overlaps or conflicts with one or more network addresses utilized by another set of computing devices included either in the same network or in a different network. For instance, a computing device in a local area network may have an IP address that is the same as an IP address for a computing device in an external network (e.g., the Internet) or for another computing device in the same local area network. As a result, communications intended for one computing device may be unintentionally provided to another computing device with the same network address, even if those computing devices do not share the same domain name. In light of the rapid expansion of the number of computing devices available on most networks and the corresponding increase in the potential for conflicting network addresses, mitigating the effects of conflicting network addresses efficiently continues to be a technical challenge.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 3A is a component diagram of an example DNS server suitable for use with some embodiments.

FIG. 3B is a component diagram of an example edge computing device suitable for use with some embodiments.

DETAILED DESCRIPTION

Figure 1:
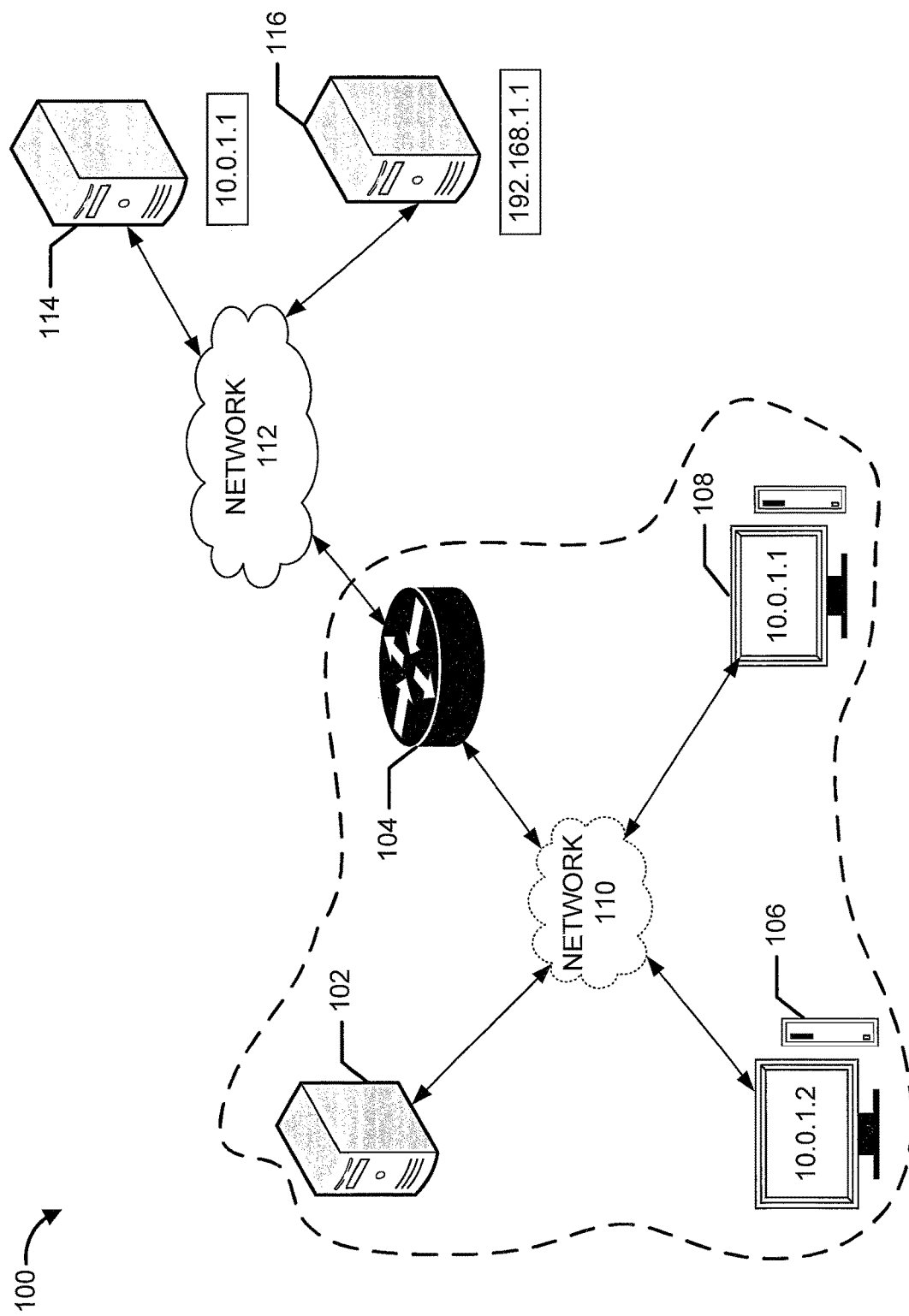
FIG. 1 is a block diagram illustrating a communication system including client computing devices, a DNS server, an edge computing device, and recipient computing devices for use with some embodiments.

As noted above, a network address of a computing device in a network may conflict with the network address of another computing device, which may be included in the same network or in a different network. Conflicting network addresses may occur because of various causes. By way of an example, two businesses may combine their respective local networks into a single local network as a result of a merger of the businesses. If each of the separate local networks includes a computing device assigned to the IP address "123.456.7.8," the combined local network will include computing devices that have the same IP address. In another example, information technologies professionals may accidently assign an IP address to a computing device in a network that is already assigned to another computing device in the same internal network or assigned to a computing device in an external network (e.g., the Internet). Regardless of the cause, communications addressed to a conflicting network address may unintentionally be provided to another computing device having the same network address as the computing device for which the communications are intended.

In a suboptimal solution to resolving issues caused by conflicting network addresses (e.g., as described above), information technology professionals or network administrators may simply reassign a new, non-conflicting network address to a computing device that is currently assigned to a conflicting network address. In particular, a network administrator may manually identify the network addresses that are conflicting, identify a non-conflicting network address, and reassign the non-conflicting network address to the computing device. While this suboptimal solution may resolve conflicting network addresses, this solution often requires a substantial amount of time and effort to resolve the conflicting network addresses. As a result, this suboptimal solution may not be feasible for managing a network with a large number of conflicting network addresses.

In overview, aspects of the present disclosure include systems and methods for resolving conflicting network addresses by utilizing a DNS server to configure an edge computing device to handle conflicting networking addresses through name resolution. Specifically, in some embodiments, the DNS server may obtain a set of conflicting network addresses. The DNS server may receive a request to resolve a hostname of a recipient computing device from a client computing device, which may include determining a network address related to the hostname. Once the DNS server has obtained the network address corresponding to the hostname (sometimes referred to herein as the "resolved network address"), the DNS server may determine that the resolved network address is included in the set of conflicting addresses. In response, the DNS server may determine another network address to use as a substitute for the resolved network address (sometimes referred to herein as a "substitute network address"). In some embodiments, the substitute network address may be a network address that is not included in the set of conflicting network addresses and/or that may be suitable (or more suitable) for use within a local network of the client computing device.

The DNS server may obtain or generate information regarding the set of conflicting addresses. In some embodiments, the set of conflicting addresses may be defined by a network administrator, and the DNS server may obtain information identifying the set of conflicting addresses from a computing device of the network administrator. In some alternative (or additional) embodiments, the DNS server may dynamically identify conflicting addresses and may include those conflicting addresses in the set of conflicting addresses. For example, the DNS server may utilize a dynamic routing protocol to identify IP addresses that conflict. Once the set of conflicting addresses is obtained or generated, the DNS server may utilize the set of conflicting addresses to determine whether an IP address conflicts with another IP address and, thus, whether to generate a substitute network address for that IP address.

The DNS server may provide the edge computing device with translation information that may enable the edge computing device to translate the substitute network address into the resolved network address of the recipient computing device. The DNS server may provide the substitute network address to the client computing device, which in turn, may provide the substitute network address to the edge computing device, along with network data intended for the recipient computing device. The edge computing device may utilize the translation information received from the DNS server to translate the substitute network address into the resolved network address of the recipient computing device and may provide the data received from the client computing device to the recipient computing device located at the resolved network address. By dynamically configuring the edge computing device to translate substitute network addresses, the DNS server may allow for more efficient use of network addresses and, in some instances, improved integration of separate networks having conflicting network addresses.

In some embodiments, the DNS server may generate translation information related to a substitute network address to include particular routing information. Specifically, in response to determining that a resolved network address is included in the set of conflicting network addresses, the DNS server may determine whether a domain related to the resolved network address or the corresponding hostname is associated with a routing rule. A routing rule may indicate a particular routing path for information that is provided to a recipient computing device in the domain. As such, the routing rule may be used to enforce security or content policies that manage how network data is provided to or received from computing devices in that domain. For example, the routing rule may indicate that network data provided to a recipient computing device in the domain must first be provided to an intermediary computing device—such as a proxy server or application-specific firewall device—before network data may be provided to the recipient computing device. In some embodiments, the routing rules may reflect sets or collections of domains that are treated similarly. By way of an example, a routing rule may indicate that a set of domains is "blacklisted" and may indicate that any network data that is provided to recipient computing devices in those domains must be logged, analyzed, or the like before being provided to recipient computing devices in those domains. Identifying and implementing a routing rule for a domain is further described with reference to FIG. 5.

As used herein, the term "edge computing device" generally refers to a computing device in a network of computing devices that receives and routes network traffic from a computing device in the network to another computing device in the same network or in a different network. In some embodiments, the edge computing device may be a router, a generic firewall device, an application-specific firewall device, a network-address-translation (NAT) device, or one of various other computing devices that serve as an intermediary or communication gateway between computing devices in separate networks. In some embodiments, an edge computing device may be configured to translate network addresses of messages received at the edge computing device. The edge computing device may maintain a translation table, routing table, or other data structure that the edge computing device may utilize to translate a network address into another network address (e.g., as further described herein).

As used herein, the term "DNS server" generally refers to a server configured to receive a request to resolve a hostname of a computing device and to obtain a network address corresponding to the hostname. In some embodiments, the DNS server may be implemented as part of a hierarchical system of multiple DNS servers. In such embodiments, each DNS server may be designated as "authoritative" for zero or more hostnames, whereby a DNS server that is authoritative for a hostname may include valid information regarding the network address corresponding to that hostname. In the event that a DNS server receives a request to resolve a hostname and the DNS server is not authoritative for that hostname, the DNS server may request the network address corresponding to that hostname from a DNS server that is authoritative for that hostname (e.g., from a DNS server higher in the hierarchy). Further, in some embodiments, a DNS server may cache or store network address information received from an authoritative DNS server and may respond to subsequent requests for that network address information with the stored network address information without requesting that information from an authoritative DNS server.

As used herein, the term "client computing device" generally refers to a computing device located in a network that is configured to communicate with computing devices in the same network or with computing devices in other networks via the edge computing device. Further, computing devices that receive network data from client computing devices may be referred to herein as "recipient computing devices." However, referring to a computing device as a "client computing device" or a "recipient computing device" is merely for ease of description and is not intended to limit the scope or functionality of such computing devices.

The various embodiments will be described in detail with reference to the accompanying drawings. Wherever possible, the same reference numbers will be used throughout the drawings to refer to the same or like parts. References made to the particular examples and implementations are for illustrative purposes, and are not intended to limit the scope of the invention or the claims.

FIG. 1 is a functional block diagram of an illustrative system 100 suitable for implementing some aspects of the present disclosure. The system 100 may include one or more client computing devices, such as client computing devices 106 and 108. Those skilled in the art will recognize that the client computing device 106 may be any of a number of computing devices that are capable of communicating over a network. Such computing devices may include, but are not limited to, laptop computers, personal computers, personal digital assistants (PDA), hybrid PDAs/mobile phones, mobile phones, smartphones, wearable computing devices, electronic book readers, digital media players, tablet computer, gaming console or controller, kiosk, augmented reality devices, other wireless devices, set-top or other television boxes, and the like. In a non-limiting example, the client computing devices 106 and 108 may be desktop or personal computers, as illustrated in FIG. 1. In the system 100, the computing devices 106 and 108 may be included within a network 110 of computing devices, which may also include a DNS server 102 and an edge computing device 104. The computing devices 106 and 108, the DNS server 102, and the edge computing device 104 may communicate with each other by exchanging data and other information via wired or wireless links over the network 110.

In some embodiments, the edge computing device 104 may be in communication with one or more recipient computing devices 114 and 116 via a connection to a network 112. In such embodiments, the edge computing device 104 may serve as a communication gateway between computing devices accessible via the network 110 (e.g., the client computing devices 106 and 108) and computing devices outside of the network 110 (e.g., the recipient computing devices 114 and 116). In the example illustrated in FIG. 1, the edge computing device 104 may receive communications from the client computing devices 106 and 108 in the network 110 that are intended for the recipient computing devices 114 and 116 in the network 112. The edge computing device 104 may provide these communications to the recipient computing devices 114 and 116, such as by routing or forwarding these communications through the network 112. The edge computing device 104 may also provide the client computing devices 106 and 108 with communications received from the recipient computing devices 114 and 116. By way of an example, the recipient computing device 116 may be a provider of network content (e.g., web page data, streaming media content, or the like), and the edge computing device 104 may provide the recipient computing device 116 with a request for content from the client computing device 106. The edge computing device may then receive requested network content from the recipient computing device 116 and may provide the network content to the client computing device 106.

Each computing device included in the network 110 may be assigned to a network address within the network 110. Similarly, each computing device within the network 112 may also have a network address. In the example illustrated in FIG. 1, the computing device 106 within the network 110 may be assigned an IP address of "10.0.1.2," and the computing device 108 may be assigned an IP address of "10.0.1.1." These IP addresses may indicate the locations within the network 110 that correspond to the computing devices 106 and 108 and may be used when sending communications (e.g., network data) to those computing devices 106 and 108. Similarly, in the example illustrated in FIG. 1, the recipient computing device 114 within the network 112 may be assigned an IP address of "10.0.1.1," and the recipient computing device 116 within the network 112 may be assigned an IP address of "192.168.1.1." In this example, the IP address of the client computing device 108 and the recipient computing device 114 may conflict as both devices are assigned to the IP address "10.0.1.1."

In some embodiments, the edge computing device 104 may receive a network address and network data from the client computing device 106 or 108 and may provide the network data to a recipient computing device corresponding to that network address. In some embodiments, the edge computing device 104 may maintain or otherwise have access to a data store that includes information needed to route data to network addresses. This information may be in the form of a routing table, translation table, or other data structure containing information that the edge computing device 104 may utilize to route network data to specific network addresses. For example, the edge computing device 104 may receive the IP address "192.168.1.1" from the client computing device 106 and may reference a routing table to identify at least a portion of the network path through which network data will be sent to reach the recipient computing device 116. In some embodiments (not shown), the network path may include one or more intermediary computing devices (e.g., proxy servers) between the edge computing device 104 and the recipient computing devices 114 and 116. In such embodiments, the one or more proxy servers may receive network data from the edge computing device 104 and may provide the network data to one or more of the recipient computing devices 114 and 116, either directly or indirectly through one or more intermediary computing devices.

Client computing devices initially rely on hostnames instead of IP or network addresses to identify a recipient computing device. As noted above, a hostname does not indicate a particular network address but may be used to determine a network address associated with that hostname. Thus, the client computing devices 106 and 108 may send requests to the DNS server 102 via the network 110 to resolve a hostname for an intended recipient computing device, such as one of the recipient computing devices 114 or 116. In response to requests to resolve a hostname, the DNS server 102 may reference a data store that stores associations between network addresses and hostnames to determine the resolved network address corresponding to the hostname. For example, the client computing device 106 may send a request to the DNS server 102 to resolve the hostname of the recipient computing device 116 accessible via the network 112. In response, the DNS server 102 may determine that the hostname for the recipient computing device 116 is associated with the IP address "192.168.1.1."

In some embodiments, the DNS server 102 may determine whether a resolved network address associated with a hostname received from a client computing device conflicts with another network address. Specifically, the DNS server 102 may determine whether the resolved network address associated with the received hostname is included in a set of network addresses previously determined to be conflicting. In such embodiments, the DNS server 102 may obtain the set of conflicting network addresses via user input or from a service that discovers and documents conflicting network addresses. In some alternative (or additional) embodiments, the DNS server 102 may determine that a resolved network address conflicts with another network address by determining that the resolved network address conflicts with a resolved network address associated with another hostname.

Continuing with the above example, in response to determining that the resolved network address "192.168.1.1" of the recipient computing device 116 is not included in a set of conflicting network addresses, the DNS server 102 may provide the client computing device 106 with the resolved network address of the recipient computing device 116. The client computing device 106 may then prepare network data intended for the recipient computing device 116. As described, the network data may include various types of information and data that the client computing device 106 may provide to the recipient computing device 116. For example, the network data may include identification information, network content, or the like. The network data may also (or alternatively) include a request for network content (e.g., a file, web site content, or the like). The client computing device 106 may provide the resolved network address and the network data to the edge computing device 104, and the edge computing device 106 may utilize the resolved network address to provide the network data to the recipient computing device 116, potentially through one or more intermediary computing devices as described.

In some embodiments in which the DNS server 102 determines that a resolved network address conflicts with another network address, the DNS server 102 may perform various operations to mitigate or avoid the conflicting network addresses. The DNS server 102 may determine a substitute network address for the resolved network address that is conflicting with another network address. In some embodiments, the substitute network address may be a network address that does not conflict with another network address (sometimes referred to herein as a "non-conflicting network address") that may be suitable for internal use within the network 110 or for external use with the network 112. For example, the DNS server 102 may determine a substitute network address that is not included in the set of conflicting network addresses. In some embodiments, the DNS server 102 may attempt to utilize a substitute network address that is within a range of network addresses associated with the network 112. For example, the DNS server 102 may attempt to utilize substitute network addresses that are internally consistent with other network addresses within the network 112.

The DNS server 102 may, in some embodiments, generate translation information related to a substitute network address and may provide the translation information to the edge computing device 104. The translation information may include information that may enable the edge computing device 104 to translate the substitute network address into an actual resolved network address. As such, in some embodiments, the DNS server 102 may utilize the translation information to configure the translation table of the edge computing device 104 (e.g., via an application interface protocol or "API") to include an entry into the translation table indicating that the substitute network address of a recipient computing device should be translated into the actual resolved network address of that recipient computing device. After configuring the edge computing device 104 with the translation information, the DNS server 102 may provide the substitute network address to the requesting client computing device. The requesting client computing device may then provide the substitute network address and network data to the edge computing device 104, which may, in turn, translate the substitute network address into the actual resolved network address of the intended recipient device and may provide the network data to the intended recipient device at the resolved network address. A more detailed example of the process by which the DNS server 102 generates a substitute network address and utilizes that substitute network address to avoid conflicting network addresses is described herein (e.g., with reference to FIG. 2).

The networks 110 and 112 may be any wired network, wireless network, or combination thereof. In addition, the networks 110 and 112 may be a personal area network, local area network, wide area network, cable network, satellite network, cellular telephone network, etc. or combination thereof. In addition, the networks 110 and 112 may be a personal area network, local area network, wide area network, over-the-air broadcast network (e.g., for radio or television), cable network, satellite network, cellular telephone network, or combination thereof. For example, the network 112 may be a publicly accessible network of linked networks, possibly operated by various distinct parties, such as the Internet. In some embodiments, the networks 110 and 112 may be private or semi-private networks, such as a corporate or university intranets. The networks 110 and 112 may include one or more wireless networks, such as a Global System for Mobile Communications (GSM) network, a Code Division Multiple Access (CDMA) network, a Long Term Evolution (LTE) network, or some other type of wireless network. The networks 110 and 112 may use protocols and components for communicating via the Internet or any of the other aforementioned types of networks. Protocols and components for communicating via the Internet or any of the other aforementioned types of communication networks are well known to those skilled in the art and, thus, are not described in more detail herein.

In some embodiments, the DNS server 102 may be in communication with one or more other DNS servers as part of a hierarchical group of DNS servers (not shown). In such embodiments, the DNS server 102 may resolve a hostname included in a request from a client computing device by determining whether the DNS server 102 is authoritative for that hostname. Specifically, the DNS server 102 may determine whether it has been designated as having authority to provide a network address that corresponds to the hostname. In the event that the DNS server 102 is authoritative for the hostname, the DNS server 102 may have access (either internally or via an external source) to network address information related to the hostname. For example, the DNS server 102 may perform a lookup operation in a database of hostname-network-address pairings. In the event that the DNS server 102 is not authoritative for the hostname, the DNS server 102 may request the network address information from one or more DNS servers in the hierarchy until the DNS server 102 receives the network address information from a DNS server that is authoritative for that hostname. In some embodiments, the DNS server 102 may store or cache the network address information received from the authoritative DNS server for use in the future. In some further embodiments, this information may be associated with time-to-live ("TTL") information representing a relative or absolute period of time that the cached network-address information may be stored before the DNS server 102 discards that information.

For ease of description, the network 110 is illustrated as including the two client computing devices 106 and 108, the DNS server 102, and the edge computing device 104. However, the system 100 may include one or more client computing devices, DNS servers, and edge computing devices without loss of scope. Similarly, the network 112 may include one or more recipient computing devices, and the edge computing device 104 may be in communication with one or more recipient computing devices via one or more external networks similar to or different than the network 112.

Figure 2:
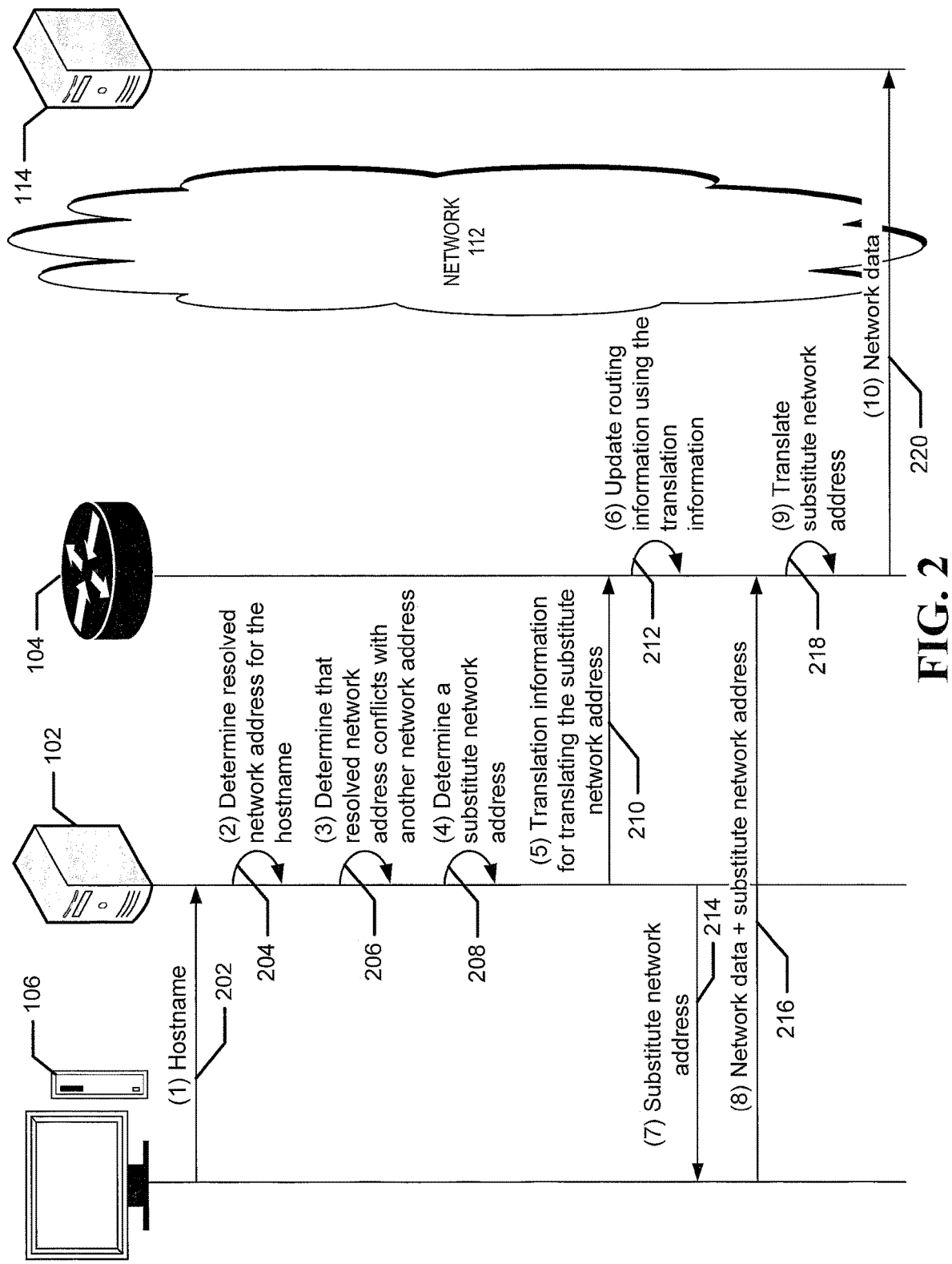
FIG. 2 is a diagram illustrating communications exchanged between a client computing device, a DNS server, and an edge computing device, according to some embodiments.

FIG. 2 is a diagram that illustrates communications between various components of the system 100 of FIG. 1 according to some aspects of the present disclosure. Specifically, the components of system 100 illustrated in FIG. 2 include the client computing device 106, the DNS server 102, the edge computing device 104, the network 112, and the recipient computing device 114 as described, e.g., with reference to FIG. 1.

As noted above, the DNS server 102 may respond to requests to resolve hostnames received from client computing devices. In the example illustrated in FIG. 2, the client computing device 106 may send a hostname 202 to the DNS server 102 in order to receive, from the DNS server 102, the network address associated with the hostname 202. The hostname 202 may be, in an example, a name or label of a particular computing device accessible either in a local network or in an external network (e.g., in the network 110 or in the network 112, as described with reference to FIG. 1). In some embodiments, the hostname 202 may be a fully qualified domain name—which is also often referred to as an absolute domain name—that identifies a DNS server within a hierarchy of DNS servers that is authoritative for that hostname.

Upon receiving the hostname 202, the DNS server 102 may, in operation 204, determine the resolved network address associated with the hostname 202. In some embodiments, the DNS server 102 may perform a table lookup in a data store or database that includes associations between hostnames and network addresses. For example, the DNS server 102 may utilize the hostname as a search value when searching the lookup table or database and may receive the resolved network address as a result of the search. In some embodiments, the DNS server 102 may obtain the resolved network address for the hostname 202 by querying other DNS servers in a hierarchy of DNS servers until a DNS server that is authoritative for the hostname 202 responds with the resolved network address. Further, in some additional (or alternative) embodiments, the DNS server 102 may cache the resolved network address and an association between the resolved network address and the hostname 202. In such embodiments, the DNS server 102 may use cached information regarding resolved network addresses of hostnames to respond to a future request received from the client computing device 106 or another client computing device.

In operation 206, the DNS server 102 may determine that the resolved network address conflicts with another network address, for example, in a local network of the client computing device 106 or in an external network. In the example illustrated in FIG. 2, the DNS server 102 may determine that the resolved network address is assigned to both the client computing device 108 in the local network 110 (e.g., as described in FIG. 1) and with the recipient computing device 114 in the external network 112. In light of this conflict, the DNS server 102 may determine a substitute network address in operation 208. As described, the substitute network address may be a network address that does not conflict with another network address. In some embodiments in which the resolved network address is assigned to a computing device within a local network of the client computing device 106 and assigned to a computing device within an external network, the DNS server 102 may determine a substitute network address that may be suitable for use within a local network of the client computing device 106 (e.g., the network 110) or, alternatively, suitable for use within the external network.

The DNS server 102 may provide translation information 210 to the edge computing device 104. The translation information 210 may include information that may enable the edge computing device 104 to translate the substitute network address determined in operation 208 into the resolved network address determined in operation 204. In some embodiments, the translation information 210 may also include an indication of the hostname 202 received from the client computing device 106. As such, the translation information 210 may indicate that a substitute network address is associated with a resolved network address and, specifically, that the hostname 202 is associated with that resolved network address. The translation information 210 may enable the edge computing device 104 to determine, without ambiguity, the computing device to which the substitute network address is associated. As such, even though the resolved network address may conflict with another network address, the combination of the resolved network address and the hostname 202 may not conflict with the combination of the resolved network address and another hostname. As a result, the edge computing device 104 may utilize the combination of the resolved network address and the hostname 202 to send communications to the computing device associated with both the resolved address and the hostname 202, as further described herein. In some embodiments, the DNS server 102 may utilize one or more protocols to provide the edge computing device 104 with the translation information 210, such as via one or more of scripts, application-program interfaces (APIs), or other software-defined network protocols.

Subsequent to receiving the translation information 210, the edge computing device 104 may update routing information with the translation information 210. In some embodiments, the edge computing device 104 may maintain or reference routing information (e.g., in the form of a routing table), and this routing information may include information that the edge computing device 104 may utilize to send communications to computing devices in various networks, either directly or indirectly. For example, the routing information may include network path information that includes the network locations of computing devices and/or locations of intermediary computing devices and, as such, may be utilized to route communications to computing devices in those networks.

After determining the substitute network address in the operation 208, the DNS server 102 may provide the client computing device 106 with a communication 214 that includes the substitute network address. In some embodiments, the communication 214 may indicate that the substitute network address corresponds with the hostname 202 that the client computing device 106 previously provided to the DNS server 102. The client computing device 106 may then provide network data and the substitute network address to the edge computing device 104, such as via a communication 216. As described above, the network data may correspond to various types of data, including (but not limited to) requests for network resources, identification information, or the like.

In response to receiving the substitute network address and the network data in the communication 216, the edge computing device may, in operation 218, utilize the translation information received in the communication 210 from the DNS server 102 to translate the substitute network address into the resolved network address determined by the DNS server 102 in the operation 204. In other words, the edge computing device 104 may translate the substitute network address into the actual network address of the recipient computing device that corresponds with the hostname 202. In the example illustrated in FIG. 2, the resolved network address may be assigned to or associated with the recipient computing device 114. The edge computing device 104 may then provide the network data received from the client computing device 106 to the recipient computing device 114 via the network 112 (e.g., as described with reference to FIG. 1).

FIG. 3A depicts a general architecture of the DNS server 102, which—as described above with reference to FIGS. 1-2—may be configured to respond to requests to resolve hostnames and to generate substitute network addresses in response to determining that a resolved network address is included in a set of conflicting network addresses. The general architecture of the DNS server 102 depicted in FIG. 3A includes an arrangement of computer hardware and software components that may be used to implement aspects of the present disclosure. The DNS server 102 may include many more (or fewer) elements than those shown in FIG. 3A. It is not necessary, however, that all of these generally conventional elements be shown in order to provide an enabling disclosure.

As illustrated, the DNS server 102 includes a processing unit 302, a network interface 304, an optional computer readable medium drive 306, and an optional input/output device interface 308, all of which may communicate with one another by way of a communication bus. The network interface 308 may provide connectivity to one or more networks (e.g., the network 110 as described with reference to FIG. 1) or computing systems and, as a result, may enable the DNS server 102 to receive and send information and instructions from and to other computing systems or services. For example, the DNS server 102 may receive, via the network interface 304, requests to resolve hostnames from one or more client computing devices, and the processing unit 302 may, in response, provide resolved network addresses or substitute network addresses to the one or more client computing devices using the network interface 304. Further, the DNS server 102 may utilize the network interface 304 to provide translation information to the edge computing device 104, wherein the translation information may enable the edge computing device 104 to translate a substitute network address into a resolved network address.

The processing unit 302 may also communicate to and from memory 310. The memory 310 may include computer program instructions (grouped as modules or components in some embodiments) that the processing unit 302 executes in order to implement one or more embodiments. The memory 310 generally includes RAM, ROM, and/or other persistent, auxiliary, or non-transitory computer-readable media. The memory 310 may store an operating system 312 that provides computer program instructions for use by the processing unit 302 in the general administration and operation of the DNS server 102. The memory 310 may further include computer program instructions and other information for implementing aspects of the present disclosure. For example, in some embodiments, the memory 310 may include a network address substitution service 314, which may be executed by the processing unit 302 to perform various operations, such as those operations described with reference to FIGS. 1, 2, 4, and 5. In some embodiments, the network address substitution service 314 may implement various aspects of the present disclosure. For example, the network address substitution service 314 may receive, from a client computing device, a request to resolve a hostname, obtain a resolved network address associated with the hostname, and determine that the resolved network address conflicts with another network address. In response, the network address substitution service 314 may also determine a substitute network address associated with the resolved network address and may provide the edge computing device 104 with translation information that the edge computing device 104 may use to translate the substitute network address into the resolved network address. The network address substitution service 314 may also provide the substitute network address to the client computing device. While the network address substitution service 314 is illustrated as a distinct module in the memory 310, in some embodiments, the network address substitution service 314 may be incorporated as a module in the operating system 312 or another application or module, and as such, a separate network address substitution service 314 may not be required to implement some embodiments.

The memory 310 may include information (e.g., stored in an optional network address cache 316) regarding recently resolved network addresses and recently determined substitute network addresses. Specifically, in some embodiments (e.g., as described above), the DNS server 102 may obtain information regarding a resolved network address associated with a hostname received from a client computing device. In response to determining that the resolved network address is not a conflicting network address, the DNS server 102 may store the resolved network address information in the memory 310 in order to enable the DNS server 102 to quickly response to a request to resolve the same hostname. In response to determining that the resolved network address is a conflicting network address, the DNS server 102 may store information regarding a substitute network address associated with the resolved network address, the network address, and translation information for translating the substitute network address into the resolved network address. As such, in response to receiving a subsequent request for the same hostname, the DNS server 102 may provide the client computing device with the cached substitute network address without having to determine the substitute network address again. In some embodiments, the DNS server 102 may determine and store TTL information associated with the cached resolved network addresses or the substitute network addresses. The TTL information may indicate a relative or absolute time at which the cached resolved network addresses or the cached substitute network addresses must be discarded. For example, the TTL information may indicate that the cached addresses must be discarded twenty-four hours from the time at which those addresses are cached.

Further, in some embodiments, the above description of the DNS server 102 may also be applied to various other DNS servers. In such embodiments, one or more DNS servers may include the components discussed above and may be configured to perform operations described with reference to the various embodiments.

FIG. 3B depicts a general architecture of the edge computing device 104, which—as described above with reference to FIGS. 1 and 2—may be configured to serve as a communication gateway between networks (e.g., the networks 110 and 112 as described with reference to FIG. 1). The general architecture of the edge computing device 104 depicted in FIG. 3B includes an arrangement of computer hardware and software components that may be used to implement aspects of the present disclosure, and the edge computing device 104 may include more or fewer elements than those shown in FIG. 3B. In particular, it is not necessary for all of these elements to be shown in order to provide an enabling disclosure.

As illustrated, the edge computing device 104 includes a processing unit 352, a network interface 354, an optional computer readable medium drive 356, and an optional input/output device interface 358, all of which may communicate with one another by way of a communication bus. The network interface 358 may provide connectivity to one or more client computing devices as via a network (e.g., the client computing devices 106 and 108 via the network 110 as described with reference to FIG. 1). The network interface 358 may provide connectivity to one or more recipient computing devices via another network (e.g., the recipient computing devices 114 and 116 via the network 112 as described with reference to FIG. 1), thereby enabling the edge computing device 104 to route network data from one or more of client computing devices in one network to one or more recipient computing devices in another network. In some embodiments, the edge computing device 104 may similarly utilize the network interface 358 to route network data from the one or more recipient computing devices to the one or more client computing devices.

The processing unit 352 may also communicate to and from memory 360. The memory 360 may contain computer program instructions (grouped as modules or components in some embodiments) that the processing unit 352 executes in order to implement one or more embodiments. The memory 360 may include one or more types of memory, such as RAM, ROM, and/or other persistent, auxiliary or non-transitory computer-readable media. The memory 310 may store an operating system 362 that provides computer program instructions for use by the processing unit 362 in the general administration and operation of the edge computing device 104. The memory 360 may further include computer program instructions and other information for implementing some aspects of the present disclosure. For example, in some embodiments, the memory 360 may include a network routing service 364, which may be executed by the processing unit 362 to perform operations, such as those operations described with reference to FIGS. 1, 2, and 6. In some embodiments, the network routing service 364 may implement some aspects of the present disclosure. For example, the network routing service 364 may receive translation information from the DNS server 102 and may utilize the translation information to translate a substitute network addressed received from a client computing device into a resolved network address of a recipient computing device.

While the network routing service 364 is illustrated as a distinct module in the memory 360, in some embodiments, the network routing service 364 may be incorporated as a module in the operating system 362 or another application or module (not shown), and as such, a separate network routing service 364 may not be required to implement some embodiments.

Figure 4:
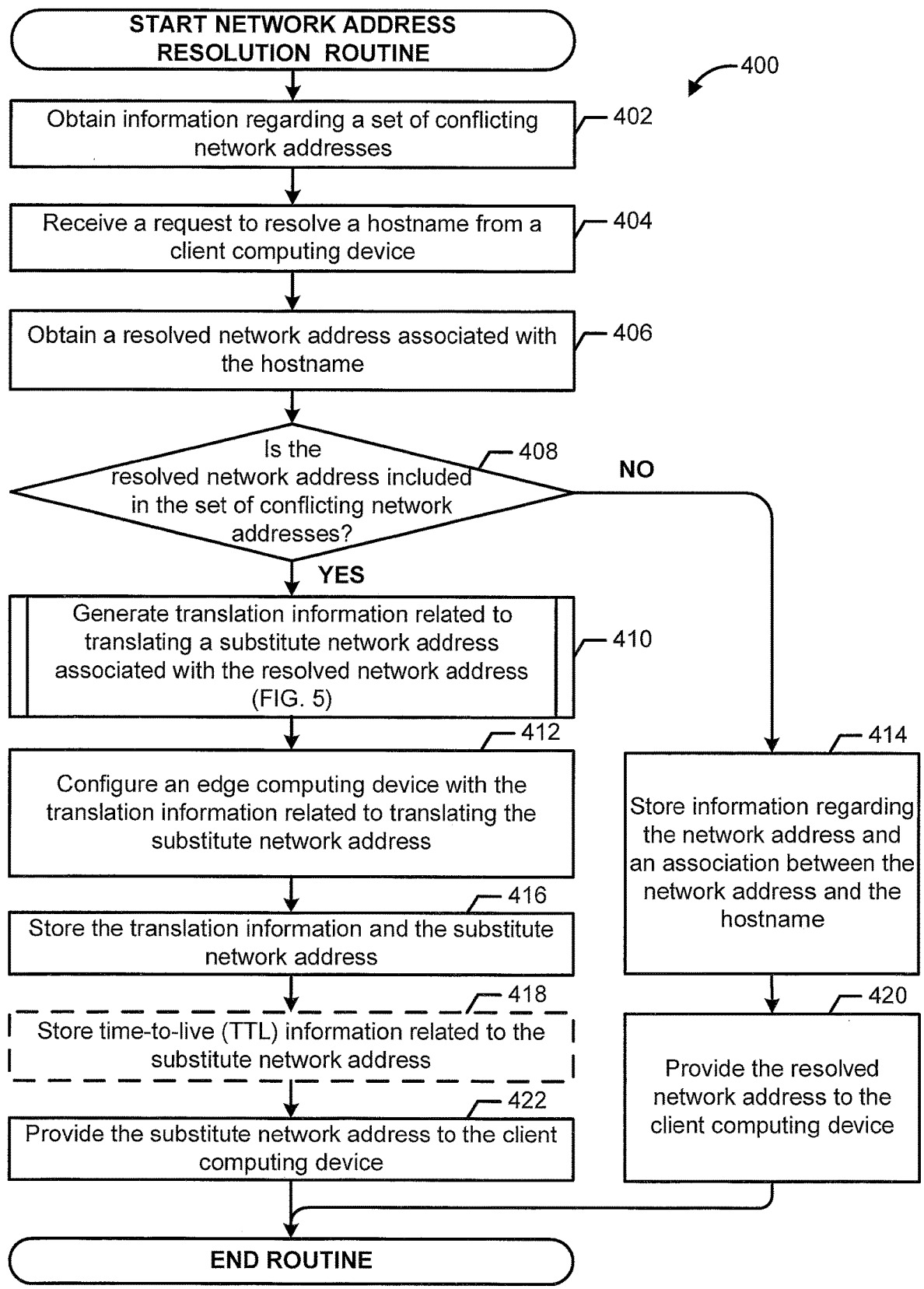
FIG. 4 is a process flow diagram illustrating a method implemented by a DNS server for generating substitute network addresses to resolve conflicting network addresses, according to some embodiments.

FIG. 4 is a process flow diagram of an illustrative routine 400 for resolving a network address, according to some embodiments. The routine 400 may be implemented with a network address substitution service on a DNS server (e.g., the network address substitution service 314 on the DNS server 102 as described with reference to FIG. 3A).

At block 402, the network address substitution service 314 may obtain information regarding a set of conflicting network addresses. In some embodiments of the operations performed at block 402, the network address substitution service 314 may obtain the set of conflicting network addresses from another computing device or from user input. Alternatively (or additionally), the network address substitution service 314 may obtain the set of conflicting network addresses by performing a comparison of routing information related to computing devices in two or more networks. In such embodiments, the network address substitution service 314 may determine whether one or more network addresses in a network are the same as one or more other addresses in at least one other network. For example, the network address substitution service 314 may determine that the network address of a computing device in a local network (e.g., the network 110 as described in FIG. 1) is the same as or conflicts with a network address of a computing device in an external network (e.g., the network 112 as described in FIG. 1). In some embodiments, the network address substitution service 314 may receive the routing information that includes the network address from one or more edge computing devices in the one or more networks.

The network address substitution service 314 may, at block 404, receive a request to resolve a hostname from a client computing device. In some embodiments, the network address substitution service 314 may determine the hostname from the request. The hostname may be text or a character string that represents a name of a computing device within a local or external network. For example, the hostname may be "<example_hostname>." The hostname may also (or alternatively) include domain information and, as such, some hostnames may correspond to the fully qualified domain name of a computing device. For example, the hostname may have a format similar to "<subdomain>.<example_hostname>. <top_level_domain>."

At block 406, the network address substitution service 314 may obtain a resolved network address associated with the hostname received at block 404 from the client computing device. Specifically, the network address substitution service 314 may reference a table or other data structure that includes information regarding network addresses (e.g., IP addresses) that are associated with hostnames. For example, the network address substitution service 314 may reference a lookup table to determine that the hostname "<example_hostname>" is related to the IP address "10.1.1.0." In some embodiments, the network address substitution service 314 may access the information regarding network addresses from local memory on the DNS server 102. For example, the lookup table or other data structure that includes the network addresses related to hostnames may be stored in the memory 310 (e.g., as described with reference to FIG. 3A). In some embodiments, the network address substitution service 314 may obtain the resolved network address from a network address cache 316 (e.g., as described with reference to FIG. 3A). Alternatively, the network address substitution service 314 may obtain the resolved network address from a DNS server that is authoritative for the hostname in a hierarchy of DNS servers.

At decision block 408, the network address substitution service 314 may determine whether the resolved network address is included in the set of conflicting network addresses obtained at block 402. For example, the network address substitution service 314 may perform a comparison of the resolved network address with one or more of the network addresses included in the set of conflicting network address to determine whether the resolved network address is the same as a network address included in the set of conflicting addresses. In response to determining that the resolved network address is not included in the set of conflicting network addresses (i.e., decision block 408="NO"), the network address substitution service 314 may store information regarding the network address and an association between the network address and the hostname, at block 414. For example, the network address substitution service 314 may store this information in the network address cache 316.

In some embodiments of the operations performed at block 414, the network address substitution service 314 may also store TTL information related to information stored at block 414. The TTL information may indicate an absolute or relative time at which to discard the information stored at block 414. As such, in some embodiments (not shown), the network address substitution service 314 may continually determine whether the absolute or relative time indicated in the TTL information has passed. In response to determining that the indicated time has passed, the network address substitution service 314 may discard the stored information.

At block 420, the network address substitution service 314 may provide the resolved network address to the client computing device. Specifically, because the network address substitution service 314 determined that the resolved network address does not conflict with another network address, the network address substitution service 314 may not need to determine a substitute network address. In contrast, in response to determining that the resolved network address is included in the set of conflicting network addresses (i.e., decision block 408="YES"), the network address substitution service 314 may generate translation information related to translating a substitute network address associated with the resolved network address, at block 410. For example, the network address substitution service 314 may identify a network address that does not conflict with a network address in the set of conflicting addresses obtained at block 402 and may generate the translation information to include information indicating that the non-conflicting network address is the substitute network address. In some embodiments of the operations performed at block 410 (e.g., as further described with reference to FIG. 5), the network address substitution service 314 may reference or otherwise utilize a set of routing rules in order to generate translation information at block 410.

At block 412, the network address substitution service 314 may configure the edge computing device 104 (e.g., as described with reference to FIGS. 1, 2, and 3B) with the translation information related to the translating the substitute network address, as generated at block 410. The network address substitution service 314 may utilize one or more APIs, scripts, or other routing protocols to provide the translation information to the edge computing device 302. For example, the network address substitution service 314 may utilize an API to configure routing tables or other routing information to include the translation information generated at block 410. In such an example in which the translation information indicates that the substitute network address corresponds to the resolved network address, the edge computing device 104 may utilize the translation information to respond to requests from client computing devices to route network data to the substitute network address by translating the substitute network address into the resolved network address and providing the network data to the recipient computing device located at the resolved network address (e.g., as further described with reference to FIG. 6).

At block 416, the network address substitution service 314 may store the translation information and the substitute network address. As described, the network address substitution service 314 may store the translation information and the substitute network address in local memory on the DNS server 102 and, optionally, in external memory. Optionally, the network address substitution service 314 may also, at optional block 418, store TTL information related to information stored at block 416 the substitute network address. As described above (e.g., with reference to block 414), the TTL information stored at optional block 418 may indicate a relative amount of time or an absolute time at which the information stored at block 416 must be discarded.

At block 422, the network address substitution service 314 may provide the substitute network address to the client computing device, which may subsequently provide the substitute network address, along with network data, to the edge computing device 104 to be routed to a recipient computing device located at the resolved network address corresponding to the substitute network address. As further described (e.g., with reference to FIG. 6), the edge computing device 104 may receive the substitute network address and may utilize the translation information generated at block 410 to translate the substitute network address into the actual resolved network address of the recipient computing device.

In response to providing the substitute network address to the client computing device at block 422 or in response to providing the resolved network address to the client computing device at block 420, the network address substitution service 314 may terminate performing the operations of the routine 400.

Figure 5:
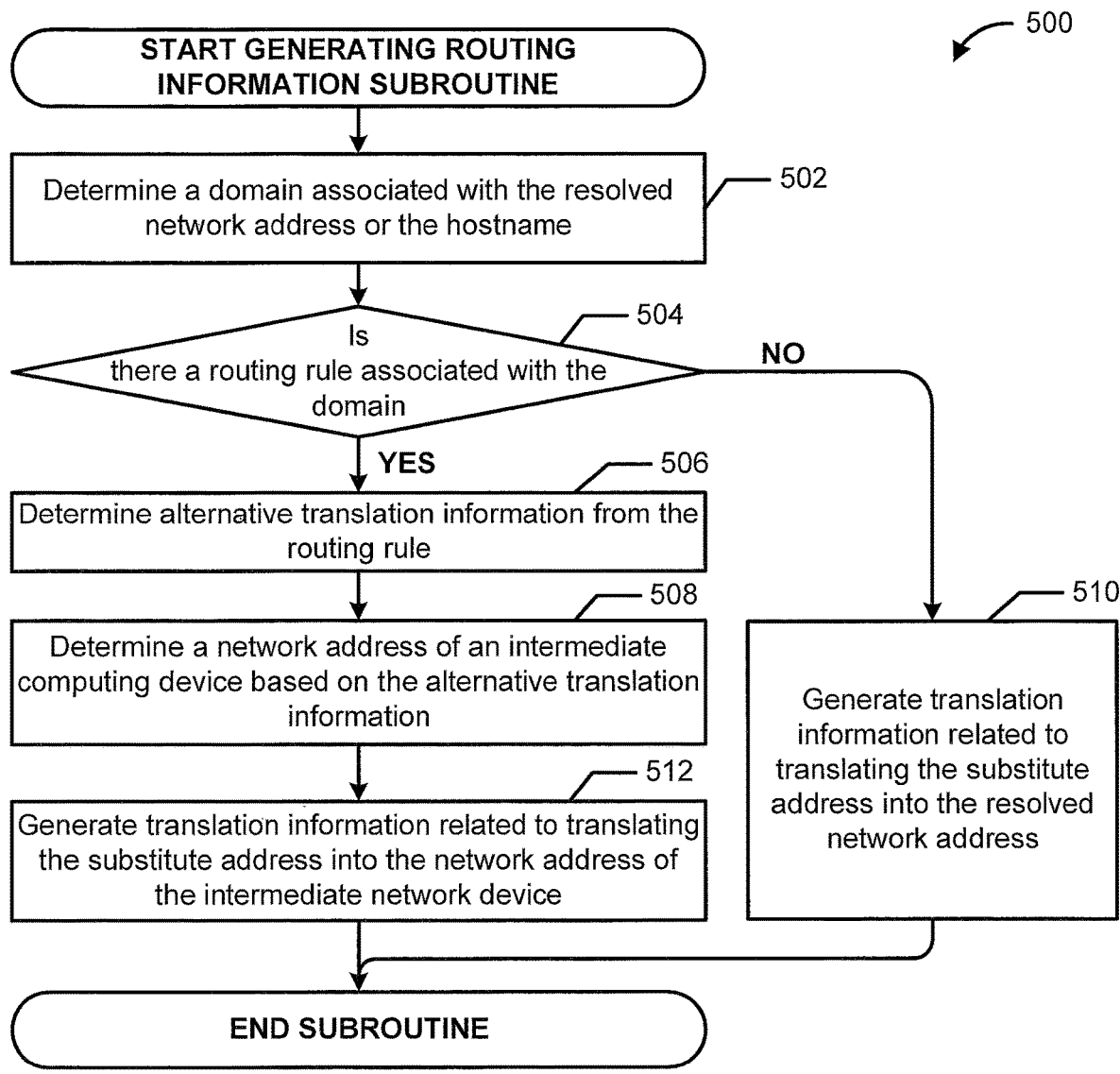
FIG. 5 is a process flow diagram illustrating a method implemented by a DNS server for generating translation information related to a substitute network address based on a routing rule, according to some embodiments.

FIG. 5 is a process flow diagram of an illustrative subroutine 500 for generating translation information, according to some embodiments. The subroutine 500 may be implemented with a network address substitution service operating on a DNS server (e.g., the network address substitution service 314 of the DNS Server 102 as described with reference to FIG. 3A). The subroutine 500 implements an embodiment of the operations of block 410 of the routine 400 as described with reference to FIG. 4.

At block 502, the network address substitution service 314 may determine a domain associated with the resolved network address or with the hostname. For example, the network address substitution service 314 may identify a domain name that is included as part of the hostname. In some embodiments, the network address substitution service 314 may perform a lookup operation in a table of network address/domain combinations using the resolved network address. The results of the search may include a domain that is associated with the resolved network address. In some embodiments, the table of network address/domain combinations may correspond to a whitelist of domains, to a blacklist of domains, or to a specific collection of domains. Each collection of domains may correspond to a particular policy, such as a corporate network policy. For example, the whitelist of domains may include domains that a client computing device in the corporate network may be permitted to visit, and the blacklist of domain may include domains for which the client computing device may be permitted to have limited or no contact.

At decision block 504, the network address substitution service 314 may determine whether there is a routing rule associated with the domain of the resolved network address or the hostname. In some embodiments of the operations performed at decision block 504, the network address substitution service 314 may determine whether the domain associated with the resolved network address or hostname is included in a collection of domains, such as a blacklist of domains as described. Each collection of domains may be associated with one or more routing rules. For example, domains included in a blacklist may be associated with a routing rule that indicates that all communications to a recipient computing device included in the domain must be first sent to an intermediary computing device, such as a proxy server, that performs a deep inspection of and logs the network data being sent to the recipient device. In some embodiments, individual domains may be associated with specific routing rules.

In response to determining that there is a routing rule associated with the domain of the resolved network address or the hostname (i.e., decision block 504="YES"), the network address substitution service 314 may determine alternative translation information from the routing rule, at block 506. In some embodiments, the alternative translation information may indicate one or more intermediary computing devices that may be included in a routing path between a client computing device and a recipient computing device. For example, the alternative translation information may indicate that network data sent from a client computing device must be provided to one or more intermediary computing device before that network data may be provided to a recipient computing device associated with the resolved network address. By way of an example in which the resolved network address of the recipient computing device is associated with a particular collection of domains, the network address substitution service 314 may determine that the alternative translation information indicates that network data must be received by a proxy server that strips out identifying information related to the user of the client computing device from the network data before that network data is provided to the recipient computing device. As such, at block 508, the network address substitution service 314 may determine a network address of at least one intermediate computing device based on the alternative translation information.

At block 512, the network address substitution service 314 may generate translation information related to translating the substitute address into the network address of the intermediate network device. The network address substitution service 314 may then provide the translation information to the edge computing device 104, and, in response to receiving the substitute network address from a client computing device, the edge computing device may utilize the translation information to translate the substitute network address into the intermediary computing device's network address. In such embodiments, the edge computing device 102 may provide network data to the intermediary device and may indicate that the resolved network address is the final destination of the network data.

In response to determining that there is no routing rule associated with the domain of the resolved network address or the hostname (i.e., decision block 504="NO"), the network address substitution service 314 may generate translation information related to translating the substitute address into the resolved network address, such as generally described above (e.g., with reference to FIG. 4). In response to generating the translation information at block 510 or generating the translation information at block 512, the network address substitution service 314 may cease performing the operations of the subroutine 500. The network address substitution service 314 may then return to performing operations in the routine 400, such as by configuring the edge computing device with the translation information generated at either of block 510 or block 512.

Figure 6:
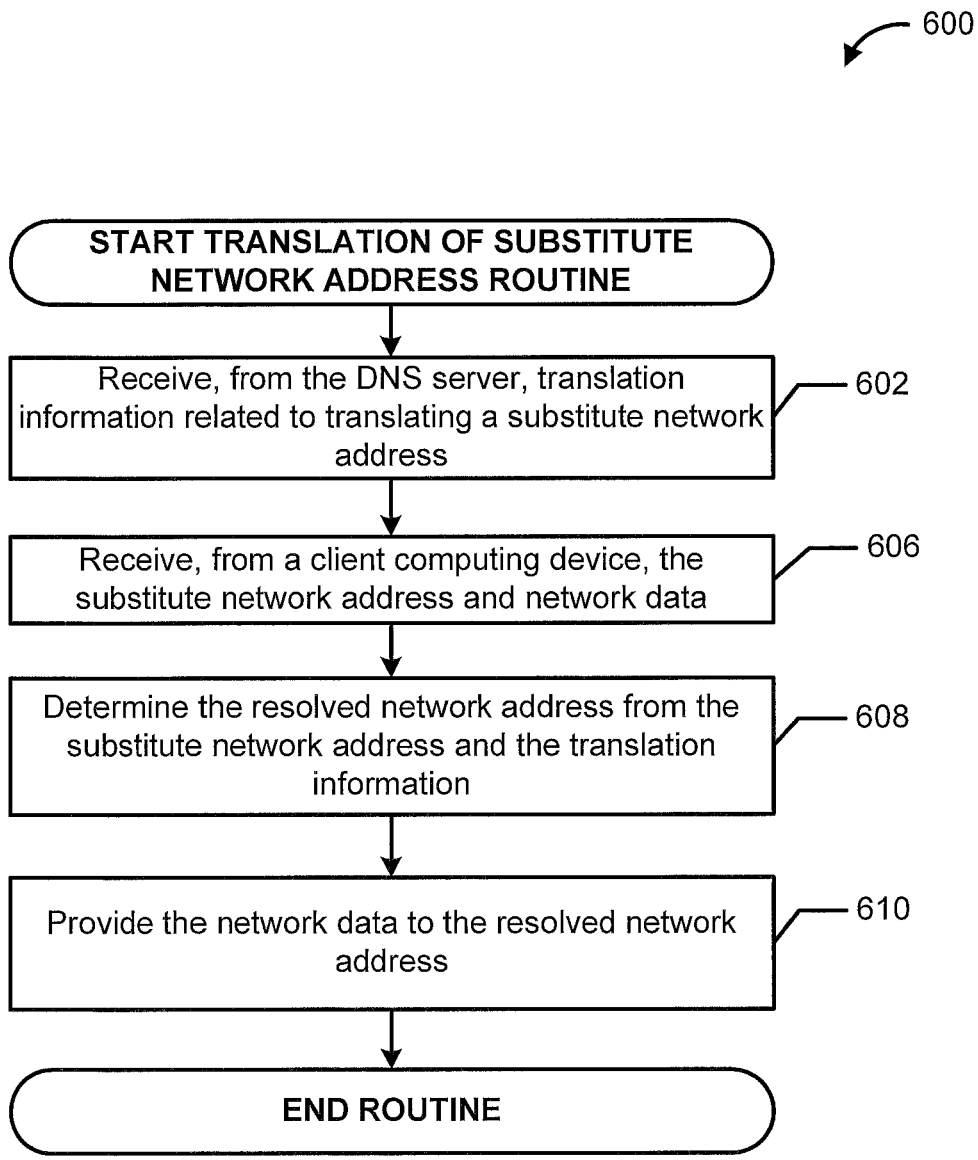
FIG. 6 is a process flow diagram illustrating a method implemented by an edge computing device for translating a substitute network address, according to some embodiments.

FIG. 6 is a process flow diagram of an illustrative routine 600 for translating a substitute network address, according to some embodiments. The routine 400 may be implemented with a network routing service on an edge computing device (e.g., the network routing service 364 on the edge computing device 104 as described with reference to FIG. 3B).

At block 602, the network routing service 364 may receive, from the DNS server 102, translation information related to translating a substitute network address. As described, the translation information may include an indication of the substitute network address and a network address to which the substitute network address corresponds. In some embodiments, the translation information may indicate the substitute network address corresponds to a resolved network address of a recipient computing device. In some alternative or additional embodiments (e.g., as described with reference to FIG. 5), the translation information may indicate that the substitute network address corresponds to a network address of an intermediary computing device to which network data is provided before the network data is provided to the recipient computing device.

At block 606, the network routing service 364 may receive, from a client computing device, the substitute network address and network data. The network routing service 364 may then determine, at block 608, the resolved network address from the substitute network address and the translation information received from the DNS server 102 at block 602. For example, the network routing service 364 may reference the translation information to determine that the substitute network address corresponds to the resolved network address.

At block 610, the network routing service 364 may provide the network data to a computing device located at the resolved network address. In some embodiments in which the resolved network address corresponds with an intermediary computing device, the network routing service 364 may provide the network data to the intermediary computing device. The network routing service 364 may further instruct indicate to the intermediary computing device that the network data is intended to be received ultimately by the recipient computing device. For example, the network routing service 364 may provide the network data to a proxy server to perform filtering, stripping, or the like to the network data before the network data is provided to the recipient client device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
 a domain-name-system (DNS) server comprising a first processor configured with processor-executable instructions to perform operations comprising:
  receiving, at the DNS server from a client computing device, a request to resolve a hostname; and
  responsive to the request,
   obtaining, at the DNS server, a resolved network address associated with the hostname;
   determining, at the DNS server, that the resolved network address conflicts with another network address;
   determining, at the DNS server, a substitute network address associated with the resolved network address;
   responsive to determining the substitute network address, providing an edge computing device with translation information for processing a subsequent request from the client computing device by translating the substitute network address into the resolved network address, wherein the subsequent request from the client computing device includes the substitute network address; and
   after providing the edge computing device with the translation information, providing the substitute network address to the client computing device from the DNS server.

2. The system of claim 1, wherein:
 the system further comprises the edge computing device; and
 the edge computing device comprises a second processor configured with processor-executable instructions to perform operations comprising:
  receiving, from the DNS server, the translation information for translating the substitute network address into the resolved network address;
  receiving, from the client computing device, the substitute network address and network data;
  determining the resolved network address from the substitute network address and the translation information; and
  providing the network data to a computing device at the resolved network address.

3. The system of claim 1, wherein the edge computing device comprises one of an edge router device, a firewall device, or a network-address-translation device.

4. The system of claim 1, wherein providing an edge computing device with translation information comprises:

generating instructions for updating a routing table with the translation information; and providing the instructions to the edge computing device.

5. The system of claim 4, wherein providing the instructions to the edge computing device comprises providing the instructions to the edge computing device via one of an application program interface of the edge computing device, a tool-command-language script, or a Simple Network Management Protocol message.

6. The system of claim 1, wherein the first processor is configured with processor-executable instructions to perform operations further comprising receiving a set of conflicting network addresses, wherein each network address of the set of conflicting network addresses conflicts with another network address.

7. The system of claim 6, wherein determining that the resolved network address conflicts with another network address comprises determining that the resolved network address is included in the set of conflicting network addresses.

8. The system of claim 7, wherein the resolved network address is a network address in a local network of the client computing device.

9. A computer-implemented method comprising:
obtaining, at a domain-name-system (DNS) server, a resolved network address associated with a hostname;
determining, at the DNS server, that the resolved network address conflicts with another network address;
determining, at the DNS server, a substitute network address associated with the resolved network address;
responsive to determining the substitute network address, providing an edge computing device with translation information for processing a subsequent request from the client computing device by translating the substitute network address into the resolved network address, wherein the subsequent request from the client computing device includes the substitute network address; and
after providing the edge computing device with the translation information, providing the substitute network address to a client computing device from the DNS server.

10. The computer-implemented method of claim 9 further comprising:
generating time-to-live information related to the substitute network address; and
storing the time-to-live information.

11. The computer-implemented method of claim 10 further comprising:
determining that the time-to-live information has expired; and
causing the edge computing device to discard the translation information for translating the substitute network address into the resolved network address.

12. The computer-implemented method of claim 9 further comprising:
determining a domain associated with the resolved network address;
determining a routing rule associated with the domain; and
determining alternative translation information from the routing rule.

13. The computer-implemented method of claim 12 further comprising:

determining a network address of an intermediate computing device based on the alternative translation information; and
generating the translation information, wherein the translation information comprises information for translating the substitute address into the network address of the intermediate network.

14. The computer-implemented method of claim 12, wherein the routing rule comprises at least one of information regarding a set of whitelisted domains or information regarding a set of blacklisted domains.

15. The computer-implemented method of claim 12, wherein the intermediate computing device comprises one of a proxy server or an application-aware firewall device.

16. A non-transitory, computer-readable medium having stored thereon server-executable software instructions configured to cause a domain-name-system (DNS) server to perform operations comprising:
obtaining, at a domain-name-system (DNS) server, a resolved network address associated with a hostname;
determining, at the DNS server, that the resolved network address conflicts with another network address;
determining, at the DNS server, a substitute network address associated with the resolved network address;
responsive to determining the substitute network address, providing an edge computing device with translation information for processing a subsequent request from the client computing device by translating the substitute network address into the resolved network address, wherein the subsequent request from the client computing device includes the substitute network address; and
after providing the edge computing device with the translation information, providing the substitute network address to a client computing device from the DNS server.

17. The non-transitory, computer-readable medium of claim 16, wherein providing the edge computing device with translation information comprises:
generating instructions for updating a routing table with the translation information; and
providing the instructions to the edge computing device.

18. The non-transitory, computer-readable medium of claim 16, wherein the first processor is configured with processor-executable instructions to perform operations further comprising receiving a set of conflicting network addresses, wherein each network address of the set of conflicting network addresses conflicts with a network address located in one of a local network or an external network.

19. The non-transitory, computer-readable medium of claim 18, wherein determining that the resolved network address conflicts with another network address comprises determining that the resolved network address is included in the set of conflicting network addresses.

20. The non-transitory, computer-readable medium of claim 16 further comprising:
generating time-to-live information related to the substitute network address;
storing the time-to-live information;
determining that the time-to-live information that was stored has expired; and
causing the edge computing device to discard the translation information for translating the substitute network address into the resolved network address.

* * * * *